(12) United States Patent
Yoshie

(10) Patent No.: US 7,001,200 B2
(45) Date of Patent: Feb. 21, 2006

(54) CONTROL ADAPTER DEVICE

(75) Inventor: Hiroto Yoshie, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/789,058

(22) Filed: Feb. 27, 2004

(65) Prior Publication Data

US 2004/0185701 A1 Sep. 23, 2004

(30) Foreign Application Priority Data

Mar. 19, 2003 (JP) .............................. 2003-076507

(51) Int. Cl.
*H01R 13/627* (2006.01)

(52) U.S. Cl. .................................................. 439/358

(58) Field of Classification Search ................ 439/358, 439/357, 350–356

See application file for complete search history.

(56) References Cited

U.S. PATENT DOCUMENTS

| 5,639,256 | A | * | 6/1997 | Endo et al. ................. 439/358 |
| 5,860,826 | A | * | 1/1999 | Chang ......................... 439/358 |
| 5,941,726 | A | * | 8/1999 | Koegel et al. .............. 439/358 |
| 6,234,828 | B1 | * | 5/2001 | Kuo ............................. 439/358 |
| 6,322,387 | B1 | * | 11/2001 | Kawamae et al. .......... 439/358 |
| 6,454,608 | B1 | * | 9/2002 | Kitahara et al. ............ 439/638 |
| 6,506,071 | B1 | * | 1/2003 | Lange ......................... 439/358 |
| 6,558,183 | B1 | * | 5/2003 | Ji et al. ....................... 439/358 |

FOREIGN PATENT DOCUMENTS

JP 2002-073259 3/2002

* cited by examiner

*Primary Examiner*—Gary Pauman
(74) *Attorney, Agent, or Firm*—Ladas & Parry LLP

(57) ABSTRACT

A control adapter device for attaching to a control unit including an input control portion is disclosed. The control adapter device includes a connector for electrically connecting the control adapter device to the control unit, a transmission unit for transmitting, by wireless transmission, a signal input that is input from the input control part, and an engagement mechanism for engaging the control unit.

4 Claims, 6 Drawing Sheets

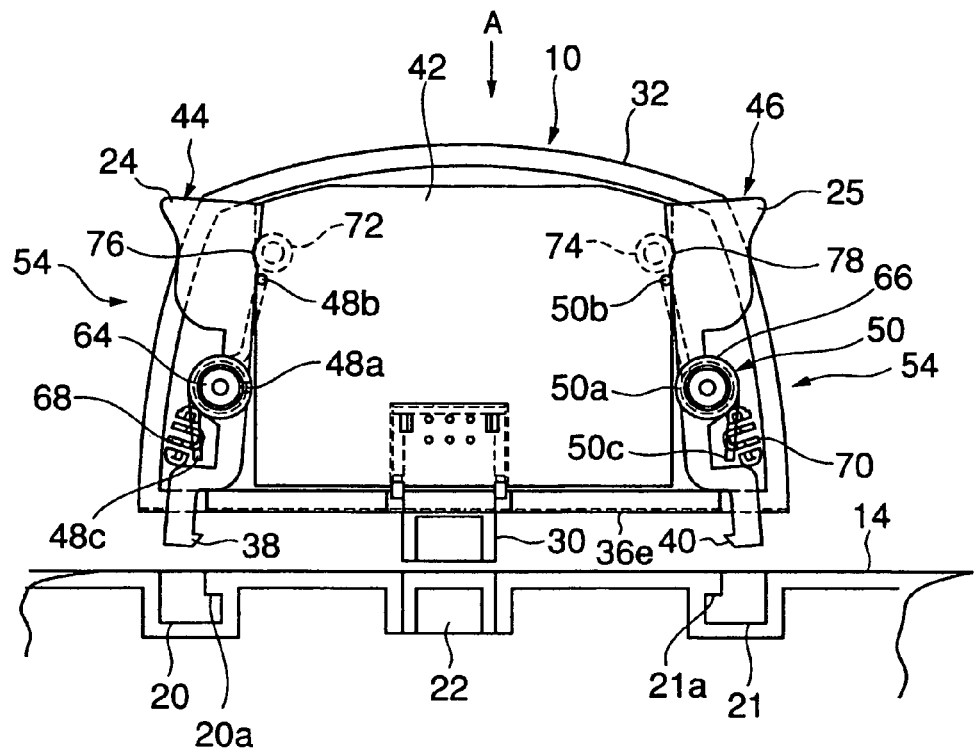

CONTROL ADAPTER DEVICE

BACKGROUND OF THE INVENTION

1. Field of the Invention

The present invention generally relates to a control adapter device, and more particularly to a control adapter device to be attached to a control unit having an input control part.

2. Description of the Related Art

As for a control unit including an input control part for allowing the user to execute an inputting maneuver (input control), there are, for example, a keyboard of a personal computer, a controller for a television game machine, and a control part used in controlling computer-controlled conveying machines or industrial robots.

These types of control units are electrically connected to an apparatus main body with a cable formed of conducting wire.

In a case where a cable (wire) is employed for transmitting signals, the control unit attains an advantage of being less vulnerable to external noise. On the other hand, the control unit has a problem of restricting the position of the user due to the limited length of the cable connected to the control unit.

Accordingly, attachment of a wireless type control adapter to a control unit is being considered for enabling a control unit of a wire type to be switched to a wireless type.

In such a case, the size of the control adapter is required to be reduced as much as possible so that the control adapter does not protrude from the control unit to the extent of adversely affecting maneuverability (controllability).

In obtaining a size-reduced control adapter that requires little space, the internal capacity of the control adapter is restricted by its outer shape (outer design). Accordingly, the installation of a mechanism for engaging the control adapter to the control unit, in addition to a connector and a circuit board for wireless transmission, will result in a considerable restriction in the space available for members such as a spring member for holding the engagement between the adapter and the control unit or a member for disengaging the engagement.

In disposing each component in accordance with the size-reduced control adapter, the shape and position of each component are modified and defined in a manner so that the component will not interfere with each other. Therefore, depending on the position at which the spring member is disposed, the maneuvering feel (control feel) during the maneuver of disengaging the engaged adapter may be adversely affected.

SUMMARY OF THE INVENTION

It is a general object of the present invention to provide a control adapter device that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a control adapter device particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a control adapter device for attaching to a control unit having an input control part, the control adapter device including: a connector for electrically connecting the control adapter device to the control unit; a transmission unit for transmitting, by wireless transmission, a signal input that is input from the input control part; and an engagement mechanism for engaging the control unit.

According to an aspect of the present invention, the control adapter device can be easily attached to the control unit by using the engagement mechanism.

According to an embodiment of the present invention, the engagement mechanism may include: an engagement member for engaging a wall of the control unit; a shaft rotatably supporting the engagement member; and an urging member for biasing the engagement member to an engagement position.

According to an aspect of the present invention, the control adapter device including a wireless unit (transmission unit) can be mounted to the control unit with a simple maneuver of rotating the engagement member.

According to the control adapter device of an embodiment of the present invention, one end of the engagement member may have a press-maneuver part for receiving a pressing force, and the other end of the engagement member has an engagement claw that is received in an engagement hole forming part of a wall of the control unit, wherein the urging member may bias the engagement member in the vicinity of the press-maneuver part.

According to an aspect of the present invention, in releasing an engagement by pressing the press-maneuver part, the engagement member can be free from deformation and an enhanced maneuvering feel can be obtained.

According to the control adapter device of an embodiment of the present invention, the urging member may be a torsion spring, wherein a coil portion of the torsion spring may be housed in the engagement member, wherein one end of the torsion spring may bias the engagement member in the vicinity of the press-maneuver part.

According to an aspect of the present invention, the urging member provides a satisfactory pressing feel at the press-maneuver part and thus has a compact structure.

Other objects and further features of the present invention will be apparent from the following detailed description when read in conjunction with the accompanying drawings.

BRIEF DESCRIPTION OF THE DRAWINGS

FIGS. 2A through 2D are external views showing a structure of a control adapter device according to an embodiment of the present invention in which FIG. 2A is a front view, FIG. 2B is a plane view, FIG. 2C is a side view, and FIG. 2D is a rear view;

FIG. 6 is a side cross-sectional view showing a state before mounting a control adapter device 10 according to an embodiment of the present invention; and FIG. 7 is a side cross-sectional view showing a state after mounting the control adapter device 10 according to an embodiment of the present invention.

DESCRIPTION OF THE PREFERRED EMBODIMENTS

In the following, embodiments of the present invention are described with reference to the accompanying drawings.

Figure 1:
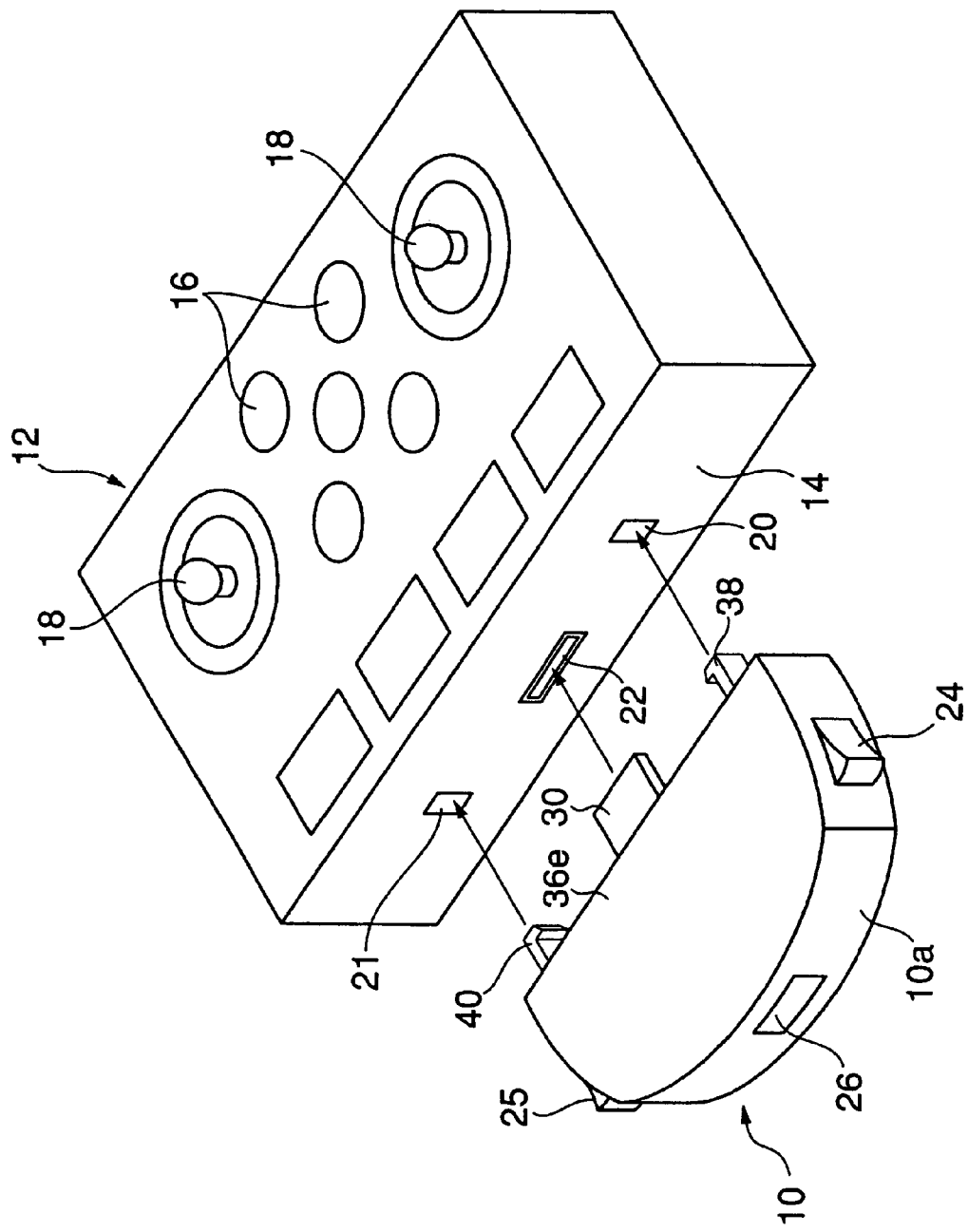
FIG. 1 is a perspective view showing a mounting operation of a control adapter device according to an embodiment of the present invention.

FIG. 1 is a perspective view showing an attachment operation of a control adapter device 10 according to an embodiment of the present invention.

In FIG. 1, the control adapter device 10 is detachably attached to a casing wall 14 of a control unit 12. An input control part including, for example, plural control buttons 16 and a control lever 18 is situated at the top surface of the control unit 12. It is to be noted that the control unit 12 may be, for example, a keyboard of a personal computer, a controller of a television game machine, or a control part for controlling a computer controlled conveying machine or an industrial robot.

The casing wall 14 includes a pair of engagement holes 20, 21, which receive an engagement mechanism 54 (described below), and a receiving connector 22. The control adapter device 10 is detachably attached to the casing wall 14 of the control unit 12 via the engagement holes 20, 22 and the receiving connector 22.

Press-maneuver parts 24, 25 for controlling engagement and disengagement are disposed at and protrude from each side of the control adapter device 10. A transmission part 26 for conducting wireless transmission of signals is disposed at a case-front end 10a of the control adapter device 10.

Thus structured, when the user depresses the control button 16 or maneuvers the control lever 18 of the control unit 12, a signal corresponding to such movements is transmitted by wireless transmission via the transmission part 26.

Accordingly, the user is able to switch the transmission type from a wire type to a wireless type by attaching the control adapter device 10 to the control unit 12.

The structure of the control adapter device 10 is next described.

Figure 2C:
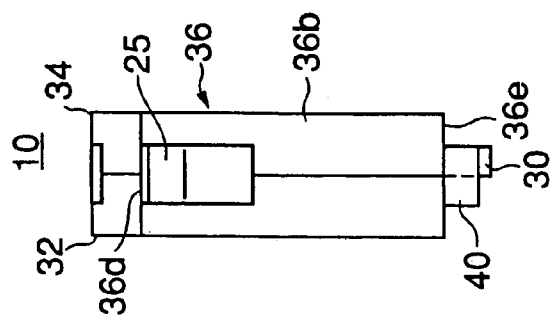
Figure 2A:
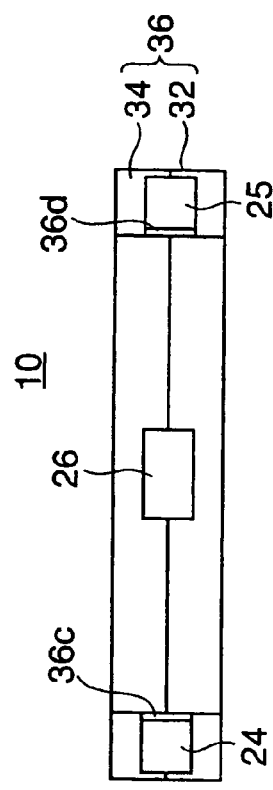
Figure 2B:
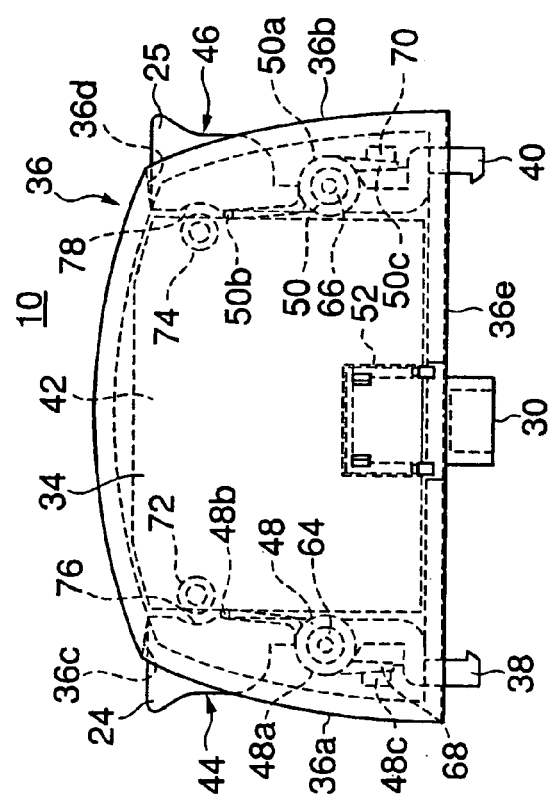
Figure 2D:
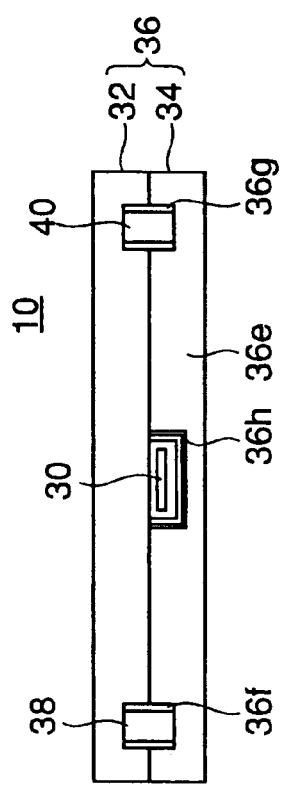

FIGS. 2A through 2D are exterior views of the structure of the control adapter 10, in which FIG. 2A is a front view, FIG. 2B is a plan view, FIG. 2C is a side view, and FIG. 2D is a rear view.

As shown in FIGS. 2A through 2D, the control adapter 10 includes a case main body 36, formed from a combination of an upper case 32 and a lower case 34. Openings 36c, 36d for allowing the press-maneuver parts 24, 25 to be inserted therethrough are formed on a left side surface 36a and a right side surface 36b of the case main body 36, respectively. Openings 36f, 36g, 36h for allowing engagement claws 38, 40, and an inserting connector 30, respectively to be inserted therethrough are formed in a rear surface 36e of the case main body 36.

The substrate 42, to which the inserting connector 30 is attached, is installed inside the case main body 36. Engagement mechanisms 54 (See FIG. 3) for engaging the control unit 12 with the control adapter device 10 are disposed at the left and right sides of the substrate 42.

The inserting connector 30 is disposed in a rearwardly protruding manner at the center portion of the rear surface 36e.

Figure 3:
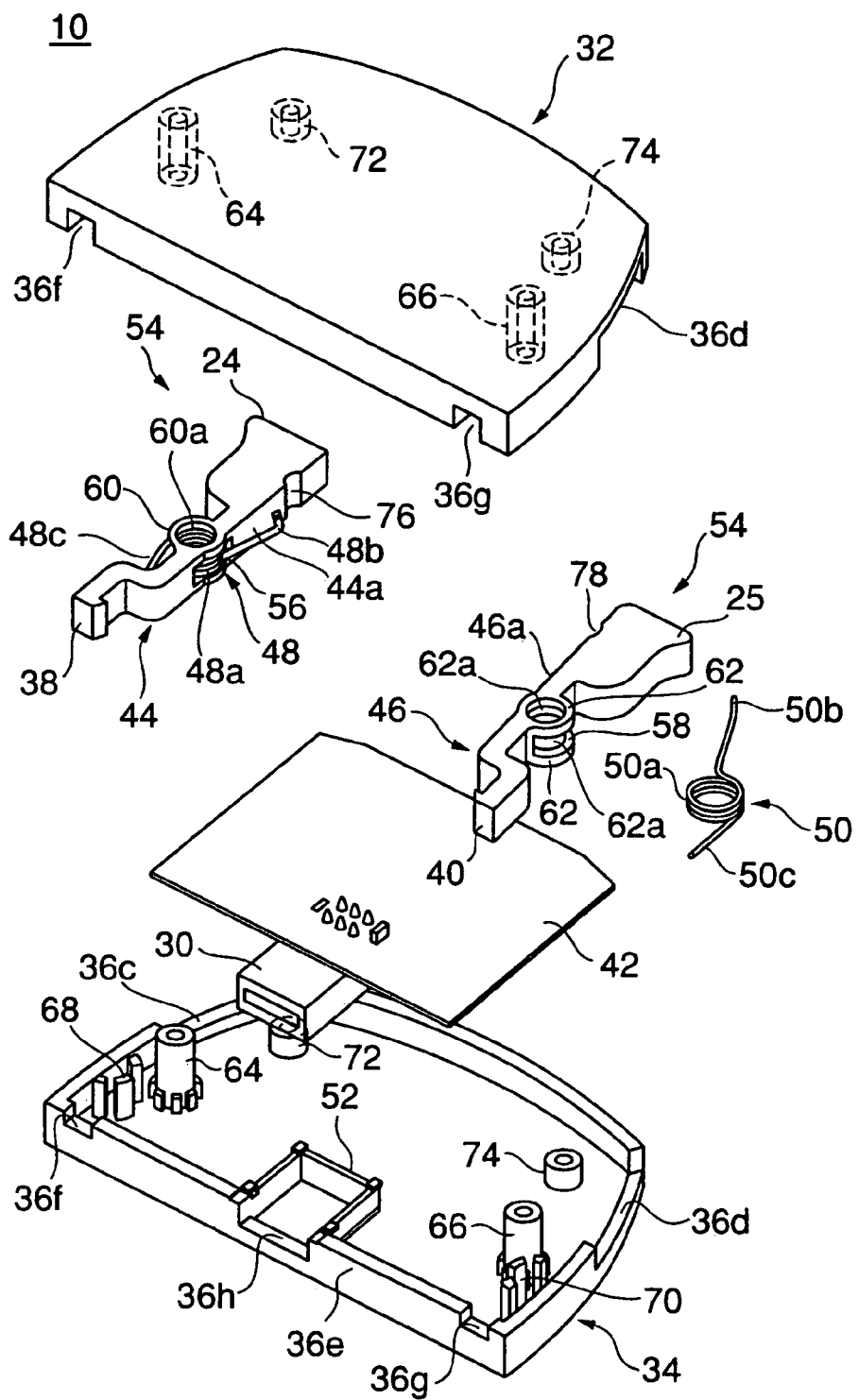
FIG. 3 is an exploded perspective view showing the structure of a control adapter device according to an embodiment of the present invention.
Figure 4:
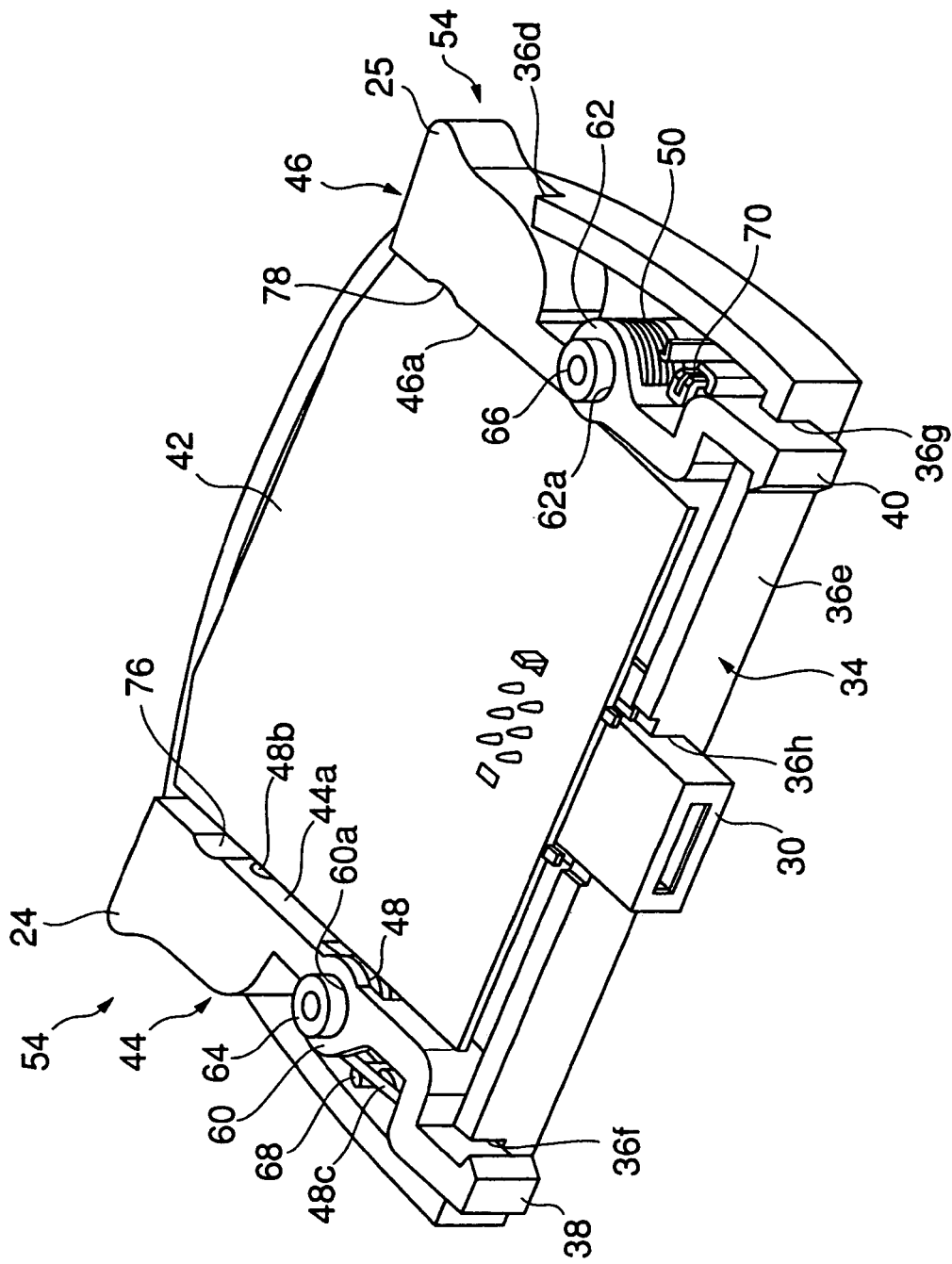
FIG. 4 is a perspective view showing an assembled state of the control adapter device of FIG. 3 where an upper case 32 is removed according to an embodiment of the present invention.

FIG. 3 is an exploded perspective view showing the structure of the control adapter device 10. FIG. 4 is a perspective view showing an assembled state where the upper case 32 is removed.

As shown in FIGS. 3 and 4, the control adapter device. 10 contains and/or supports therein: the substrate 42 having a transmission circuit (not shown) disposed in the space created by the upper case 32 and the lower case 34; engagement levers 44, 46 disposed at left and right sides, respectively, of the substrate 42; and torsion springs 48, 50 biasing the engagement levers 44, 46, respectively, in engagement directions.

The inserting connector 30 is connected, as by soldering, to a rear portion of the lower surface of the substrate 42. Respective electronic components forming a transmission circuit and a transmission antenna (not shown) are disposed at a rear portion of the upper surface of the substrate 42. The substrate 42, in a state in which the inserting connector 30 is inserted into a quadrangular connector installment wall portion 52, is sandwiched between the upper case 32 and the lower case 34.

The engagement mechanisms 54 comprise the engagement levers 44, 46 and the torsion springs 48, 50, respectively. In the illustrated exemplary embodiment, the engagement levers 44, 46 are disposed on the left and right in a symmetrical manner. The engagement levers 44, 46 include the respective press-maneuver parts 24, 25 at one end thereof, and respective engagement claws 38, 40 at the other end thereof.

Groove portions 56, 58 into which coil portions 48a, 50a of the torsion springs 48, 50 are installed, are provided at midsections (in the longitudinal direction) of the engagement levers 44, 46, respectively. Furthermore, rotative support portions 60, 62 are arranged above and below the groove portions 56, 58, respectively. The rotative support portions 60, 62 are formed with round-shaped holes 60a, 62a for inserting therethrough shafts 64, 66, respectively, uprightly formed at the inner surfaces of the upper case 32, and the lower case 34. Thus structured, the engagement levers 44, 46 rotate about the shafts 64, 66 (being engaged at the rotative support portions 60, 62) with the shafts 64, 66 serving as their rotating centers.

The engagement levers 44, 46 also have arcuate groove portions 76, 78 that make contact against below-described stoppers 72, 74, respectively. The arcuate groove portions 76, 78 are disposed at the inwardly facing side surfaces 44a, 46a situated at the rear side (inner side) of the press-maneuver parts 24, 25 of the engagement levers 44, 46. Furthermore, the arcuate groove portions 76, 78 are situated on a line (line of action) along which the pressing forces of the press-maneuver parts 24, 25 are directed.

Accordingly, the stoppers 72, 74 are subjected to the pressing forces of the press-maneuver parts 24, 25 on the line of action. Therefore, in a case where the engagement levers 44, 46 are rotated in a direction for disengaging (releasing) engagement, the stoppers 72, 74 restrict the rotation of the engagement levers 44, 46 by making contact against the arcuate groove portions 76, 78, respectively. In such a case, the engagement levers 44, 46 are positively restricted from rotating without being bent since the stoppers 72, 74 are situated on the line along which the pressing forces upon the press-maneuver parts 24, 25 are directed.

The torsion springs 48, 50 are attached to the engagement levers 44, 46 in a manner so that coil portions 48a, 50a are housed in the groove portions 56, 58, respectively, of the engagement levers 44, 46. In addition, since the torsion springs 48, 50 are coiled around the outer periphery of the shafts 64, 66, the torsion springs 48, 50 are attached to the engagement levers 44, 46 in a compact (space-saving) manner.

Other than the aforementioned shafts 64, 66, the inner surfaces of the upper and lower cases 32, 34 are provided with spring retaining portions 68, 70, and column-shaped stoppers 72, 74, respectively, for restricting the rotational movement of the engagement levers 44, 46.

Figure 5:
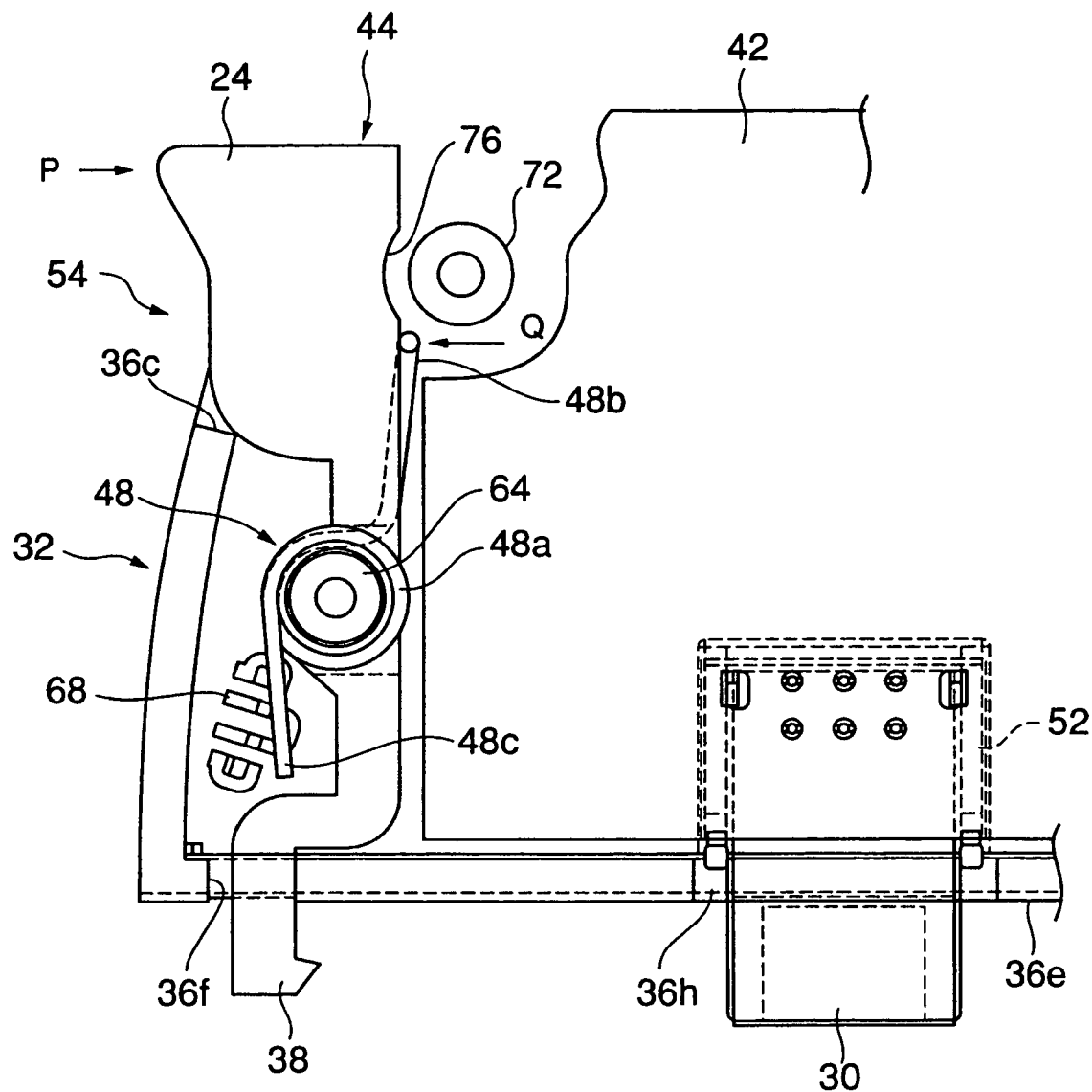
FIG. 5 is an enlarged plan view showing an attachment structure of an engagement lever 44 and a torsion spring 48 of FIG. 3 according to an embodiment of the present invention.

FIG. 5 is an enlarged plan view for explaining an attachment structure of the engagement lever 44 and the torsion spring 48 (For convenience, only one side of the attachment structure is shown).

As shown in FIG. 5, one end portion 48b (50b) of the torsion spring 48 (50), extending substantially in a radially outward direction from the coil portion 48a (50a), is inserted through an opening part of the groove portion 56 (58), to thereby allow the torsion spring 48 (50) to contact against the inwardly facing side surface 44a (46a) of the engagement lever 44 (46). The other end portion 48c (50c) of the torsion spring 48 (50), extending substantially in a radially outward direction from the coil portion 48a (50a), is retained by the spring retaining portions 68 (70) provided upright on the inner surface of the upper case 32 and the lower case 34.

The one end portion 48b (50b) of the torsion spring 48 (50) presses against the inwardly facing side surface 44a (46a) situated at the rear side (inner side) of the press-maneuver parts 24 (25) of the engagement levers 44 (46).

A pressure point P in the press-maneuver parts 24 (25) at which is applied a pressing force when the user pushes (rotates) the engagement lever 44 (46) in the engagement disengaging direction, is located in the vicinity of pressure point Q, at which is applied with a biasing force by spring contact from the one end 48b (50b) of the torsion spring 48 (50).

Accordingly, owing to the biasing force of the spring at the pressure point Q, the one end 48b (50b) of the torsion spring 48 (50), pressing the side surface 44a (46a) situated on the rear side of the press-maneuver part 24 (25), resists the engagement disengaging force of the user, and exerts a biasing force against the press-maneuver part 24 (25).

It is to be noted that in an exemplary embodiment of the present invention, the engagement lever 44 (46) is a resin mold member, and is relatively susceptible to elastic deformation in order to make uniform the radial thickness thereof. It may be considered that the engagement lever 44 (46) would bend during depression of the press-maneuver part 24 (25) since the distance from the shaft 64 (66) to the press-maneuver part 24 (25) is relatively long.

However, according to this embodiment of the present invention, the engagement lever 44 (46) can be rotated with hardly any bending since the press-maneuver part 24 (25) is pressed in the vicinity of the pressure point Q by the one end portion 48b (50b) of the torsion spring 48 (50).

Next, the operation of the engagement mechanism 54 and the mounting operation of the control adapter device 10 are described.

FIG. 6 is a side cross-sectional view showing a state before mounting the control adapter device 10.

As shown in FIG. 6, in mounting the control adapter 10 to the control unit 12, the press-maneuver parts 24, 25 are pressed from both left and right sides as in a squeezing manner. As a result, the engagement levers 44, 46 rotate in the engagement disengaging directions having the shafts 64, 66 serve as their respective centers.

The engagement levers 44, 46, which are biased against rotation by resisting the spring force of the torsion springs 48, 50, can be rotated by overcoming the spring force, to a position where the arcuate groove portions 76, 78 make contact against the stoppers 72, 74. Pressing the press-maneuver parts 24, 25 in the aforedescribed manner, allows the engagement claws 38, 40 disposed at the tips of the engagement levers 44, 46, to be in a position ready for insertion into the engagement holes 20, 21, respectively, provided in the casing wall 14 of the control unit 12. The user aligns the engagement claws 38, 40 with the engagement holes 20, 21, which also positions the inserting connector 30 in a manner facing the receiving connector 22.

Subsequently, the user moves the control adapter device 10 toward the control unit 12 in direction A, thereby inserting the engagement claws 38, 40 into the engagement holes 20, 21, respectively, and the inserting connector 30 into the receiving connector 22.

FIG. 7 is a side cross-sectional view showing a state after mounting the control adapter device 10 to the control unit 12. As shown in FIG. 7, when the rear surface 36e of the control adapter device 10 contacts the casing wall 14 of the control unit 12, the user can withdraw the force against the press-maneuver parts 24, 25. As a result, the biasing forces of the torsion springs 48, 50 urge the engagement levers 44, 46 to return to engaged positions.

Thus structured, the engagement claws 38, 40, disposed on the tips of the engagement levers 44, 46 contact in a lateral direction and engage groove portions 20a, 21a of the casing wall 14 that form part of the engagement holes 20, 21, respectively. Accordingly, by executing the foregoing engagement procedure, the control adapter 10 is attached to the casing wall 14 of the control unit 12 where the inserting connector 30 is engaged to the receiving connector 22.

Accordingly, the user presses the press-maneuver parts 24, 25, and then, while having the engagement mechanisms 54 in the engagement disengaged (released) state, the user inserts the engagement claws 38, 40 into the engagement holes 20, 21, while inserting the inserting connector 30 into the receiving connector 22. Then, by releasing the pressing force on the press-maneuver parts 24, 25, the mounting operation of the control adapter device 10 is completed.

In detaching the mounted control adapter device 10 from the control unit 12, the press-maneuver parts 24, 25 are pressed for separating the engagement claws 38, 40 from the groove portions 20a, 21a, and then, having the engagement levers 44, 46 in a disengaged state, the control adapter 10 is withdrawn from the control unit 12.

Accordingly, the user presses the press-maneuver parts 24, 25 to achieve the engagement mechanisms 54 in an engagement disengaged state, and withdraws the control adapter device 10 from the control unit 12, to thereby separate the engagement claws 38, 40 from the engagement holes 20, 21 and the inserting connector 30 from the receiving connector 22. As a result, the separation procedure of the control adapter device 10 from the control unit 12 is completed.

Although the foregoing embodiment has a pair of engagement mechanisms 54 disposed one on each the left and right sides of the control adapter device 10, the control adapter device of the present invention is not limited only to such an embodiment. For example, the engagement mechanism 54 may be disposed on only one of the sides of the control adapter device 10.

Furthermore, although the foregoing embodiment has the inserting connector 30 disposed on the rear surface of the control adapter device 10 the control adapter device of the present invention is not limited only to such an embodiment. For example, the receiving connector 22 may be disposed on the rear surface of the control adapter device 10.

Furthermore, although the foregoing embodiment has a transmission circuit provided on the substrate 42, the control adapter device of the present invention is not to be limited only to such an embodiment. For example, a transmission circuit and a reception circuit may be provided on the substrate 42.

Further, the present invention is not limited to these embodiments, but various variations and modifications may be made without departing from the scope of the present invention.

The present application is based on Japanese Priority Application No.2003-76507 filed on Mar. 19, 2003, with the Japanese Patent Office, the entire contents of which are hereby incorporated by reference.

What is claimed is:

1. A control adapter device for attaching to a control unit having an input control part, the control adapter device comprising:

a connector for electrically connecting the control adapter device to the control unit;

a transmission unit for transmitting, by wireless transmission, a signal input that it input from the input control part;

an engagement mechanism for engaging the control unit; and a case main body for positioning the engagement mechanism at least on one of the left side and the right side of the connector and the transmission unit;

wherein the engagement mechanism includes a rotatably moveable engagement member for engaging a wall of the control unit;

wherein the rotatably moveable engagement member includes a groove portion;

wherein one end of the rotatably moveable engagement member has a press-maneuver part for receiving a pressing force;

wherein the groove portion is situated on a line of action along which the pressing force of the press-maneuver part is directed;

wherein the case main body includes a stopper which the groove portion contacts when the rotatably moveable engagement member is rotated in a disengaging direction by the pressing force of the press-maneuver part.

2. The control adapter device as claimed in claim 1, wherein the engagement mechanism further includes:

a shaft rotatably supporting the rotatably moveable engagement member; and an urging member for biasing the rotatably moveable engagement member to an engagement position.

3. The control adapter device as claimed in claim 2, wherein the other end of the rotatably moveable engagement member has an engagement claw that is received in an engagement hole forming part of a wall of the control unit, wherein the urging member biases the rotatably moveable engagement member in the vicinity of the press-maneuver part.

4. The control adapter device as claimed in claim 2, wherein the urging member is a torsion spring, wherein a coil portion of the torsion spring is housed in the rotatably moveable engagement member, wherein one end of the torsion spring biases the rotatably moveable engagement member in the vicinity of the press-maneuver part.

* * * * *